(12) United States Patent
Nam et al.

(10) Patent No.: US 10,216,354 B2
(45) Date of Patent: Feb. 26, 2019

(54) INTERFACE APPARATUS FOR DISPLAYING 3D INFORMATION OF CONTENT IN MAIN DISPLAY APPARATUS AND SYSTEM FOR DISPLAYING 3D INFORMATION OF CONTENT

(71) Applicant: Korea Advanced Institute of Science and Technology, Daejeon (KR)

(72) Inventors: Tek Jin Nam, Daejeon (KR); Jun Gu Sim, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 581 days.

(21) Appl. No.: 14/607,134

(22) Filed: Jan. 28, 2015

(65) Prior Publication Data

US 2015/0242044 A1  Aug. 27, 2015

(30) Foreign Application Priority Data

Jan. 28, 2014  (KR) ........................ 10-2014-0010115

(51) Int. Cl.
```
G06F 1/16       (2006.01)
G06F 3/0481     (2013.01)
G06F 3/14       (2006.01)
G06F 3/039      (2013.01)
H04N 13/349     (2018.01)
G09G 3/00       (2006.01)
```

(52) U.S. Cl.
CPC ........ *G06F 3/04815* (2013.01); *G06F 1/1643* (2013.01); *G06F 1/1649* (2013.01); *G06F 3/039* (2013.01); *H04N 13/349* (2018.05); *G06F 1/1615* (2013.01); *G06F 3/1423* (2013.01); *G09G 3/001* (2013.01)

(58) Field of Classification Search
CPC ........ G06F 3/0346; G06F 3/14; G06F 3/0488; G06F 3/0481; H04N 21/4131; H04N 21/42207; H04N 21/42222; H04N 21/42224; H04N 21/4312; H04N 2205/441; H04N 2205/443; H04N 5/4403
See application file for complete search history.

(56) References Cited

U.S. PATENT DOCUMENTS 3,816,646 A * 6/1974 Cinque .................. G03B 21/00
                                                        348/63
5,204,776 A * 4/1993 Seamans ............ G02B 27/2257
                                                        359/466
5,959,605 A * 9/1999 Gilblom ................ G06F 1/1601
                                                        345/536

(Continued)

*Primary Examiner* — Nalini Mummalaneni
(74) *Attorney, Agent, or Firm* — Paratus Law Group, PLLC

(57) ABSTRACT

Provided is a system for implementing 3D information of contents includes: a main display device that outputs 2D planar information; and a tangible interface device that reference position, which are 2D coordinate values on a display panel of the main display device, to the basis display device, receiving 3D contents according to height information for the reference position from the main display device or a specific storage device and outputs the 3D contents to a content display unit, and adjust the height of the content display unit to be matched with the height information.

12 Claims, 6 Drawing Sheets

(56) References Cited

U.S. PATENT DOCUMENTS

| | | | |
|---|---|---|---|
| 2002/0079143 A1* | 6/2002 | Silverstein | G06F 1/1626 178/18.01 |
| 2003/0098832 A1* | 5/2003 | Fraser | G06F 1/1626 345/87 |
| 2015/0195512 A1* | 7/2015 | Kishikawa | G06T 17/05 348/55 |

* cited by examiner (a)

(b)

(a)

(b)

INTERFACE APPARATUS FOR DISPLAYING 3D INFORMATION OF CONTENT IN MAIN DISPLAY APPARATUS AND SYSTEM FOR DISPLAYING 3D INFORMATION OF CONTENT

CROSS REFERENCE TO PRIOR APPLICATION

This application claims priority to and the benefit of Korean Patent Application No. 10-2014-0010115, filed on Jan. 28, 2014, the disclosure of which is incorporated herein by reference in its entirety.

BACKGROUND

The following description relates to an interface device for a content object output on a display device.

The recent lifestyle has been changed technologically rapidly with the development and popularization of media such as a smartphone and a tablet computer. It is now natural to touch displays and see information through them. However, such an environment satisfies the hunger for information, but has a limit in satisfying the desire for experiences. The experiences that flat displays can provide are ones artificially made by designers or programmers and are against common sense of nature sometimes.

Various interface methods and devices have been studied on the basis flat display devices. Tangible interaction is a technique that provides natural and realistic interaction for specific contents or objects on displays.

Recently, many studies using a tangible block have been conducted to implement tangible interaction in a table top computing environment.

SUMMARY

Most tangible blocks of the related art are little different from display of information using 2D graphics, except for easy operation. Although there has been proposed a technique using 3D spaces such as 'Shape display' that can render 3D content physically so users can interact with digital information in a tangible way, but there is a problem in that the platform is large in volume and its position is fixed.

The following description has been designed to provide an interface device expanding a 2D screen image into a 3D space and simultaneously providing convenient interaction.

The technical purpose of the following description is not limited to those described above and other aspects will be clearly understood by those skilled in the art from the following description.

The following description has been designed to provide an intuitional interface using a 2D image including 3D information. The following technology could be applicable to education, marketing, business, etc. The following technology especially could be useful as an interface apparatus for cooperative work environment as like a table top computing environment or surface computing environment.

The technical effect of the following description is not limited to those described above and other aspects will be clearly understood by those skilled in the art from the following description.

DETAILED DESCRIPTION

Figure 1:
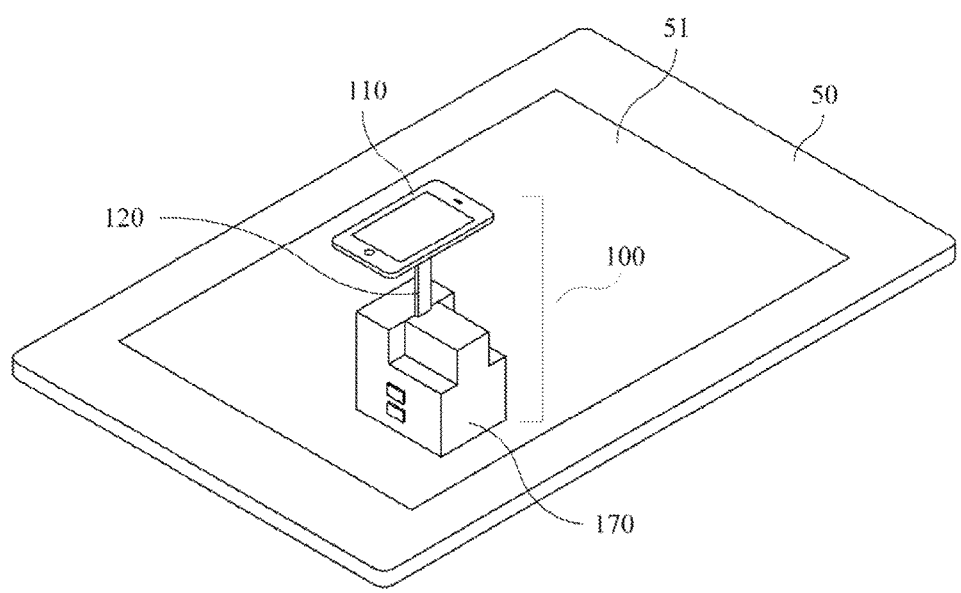
FIG. 1 is a view illustrating an example of an interface device displaying 3D information of contents on a main display device.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It should also be noted that in performing a method or an operating method, processes of the method may occur out of noted order unlike otherwise mentioned. In other words, the respective processes may be executed in the same order as the noted order, may be executed substantially concurrently, or may be executed in the reverse order.

The technology to be described below relates to tangible interaction. The technology to be described below relates to a tangible block that outputs information about an object associated with an image displayed on a basic flat display device or controls the object.

For example, a tabletop computer is based on a table type of display device. The tabletop computer is a device in which an integration unit of a large LCD display and a multitouch input device are integrated, and is useful in a ubiquitous environment. The tabletop computer is useful for a cooperative environment for several people. Further, it can be used with various interface supplement devices on its display, so it has been considered as a computing environment that provides new experiences for users. As the tabletop computer, there are a Diamond Touch system by MERL, a Microsoft Surface by Microsoft, and the like.

The technology to be described below provides a 3D environment by displaying information about a content object, which is outputted in 2D by a device such as a tabletop computer, on a specific interface device. However, the technology to be described below is not limited to a tabletop computer, but is available for a tablet PC, a common PC, and the like. Detailed embodiments will be described below.

First, terminologies used herein are described. The technology to be described below provides 3D information for 2D contents. The 3D information depends on 2D coordinates on a main display device, so it may be considered as 2.5D information. Information outputted from an interface device, however, depends on 2D coordinates on a main display device and the height values of the coordinates, so it is referred to as 3D information.

For example, 3D information may mean information at a predetermined z-axial height over a specific point on an x-y plane. For a blueprint of a building, 3D information may be a plan view of each floor. Various embodiments can be achieved and detailed examples will be described below. Content exhibiting 3D information is referred to as 3D content. Content, for example, outputted from the display device of the tabletop computer described above is referred to as a basic content. The technology to be described below uses an interface device for tangible blocks. In the following description, a device for tangible blocks is referred to as an interface device displaying 3D information about contents. An interface device displaying 3D information of contents includes a specific display device displaying 3D contents. A display device displaying 3D contents is referred to as a content display device. A display device displaying basic contents, as in a tabletop computer, is referred to as a main display device. The main display device includes a flat display device with a touch screen, a flat display device without a touch panel, or a projector.

The basis of 3D information is the position on a plane and height (distance information) of the position on the plane or information relating to the height. The position on a plane that is the base of 3D information in a main display device is referred to as a planar reference position. 3D information is specified by a planar reference position and a 3D position depending on the height value of the planar reference position. 3D information may be different at each 3D position, and in some cases, the same information may be assigned for several 3D positions. A 3D position determined by a planar reference position and the height value of the planar reference position is referred to as a 3D reference position.

A system providing 3D information of contents includes a main display device and an interface device displaying 3D information of the contents.

An interface device 100 displaying 3D information of contents on a main display device and a system 200 for implementing 3D information of contents will be described hereafter in detail with reference to the accompanying drawings.

FIG. 1 is a view illustrating an example of an interface device 100 displaying 3D information of contents on a main display device 50.

A flat display device such as a tabletop computer is exemplified for the main display device 50 in the figures. A user can experience 3D information by moving the interface device 100 displaying 3D information of contents on a display panel 51 of the main display device 50.

The interface device 100 includes a content display unit 110 that outputs 2.5 contents and a support unit 120 that supports the content display unit 110. The content display unit 110 can output different 3D contents, depending on coordinates of the position of the interface device 100 on the display panel 51.

As described above, a 3D content is specified by a planar reference position and the height value of the planar reference position. A 3D content may be only one content for a planar reference position or, it may be a plurality of contents, depending on the height value of a planar reference position. When a 3D content corresponds to one content, it may have a height value, or it may not have a height value in some cases.

When a 3D content has a height value but the height of the content display unit 110 is different from the height value of the 3D content, the content display unit 110 can be adjusted to the height value. The support unit 120 allows for adjustment of the height of the content display unit 110. The support unit 120 is not illustrated in detail in FIG. 1. The support unit 120 may be received in a housing 170 having a predetermined outer shape. The housing 170 may be ergonomically designed for a user to easily hold it. The housing 170 illustrated in FIG. 1 is just an example and may be implemented in various shapes.

Figure 2:
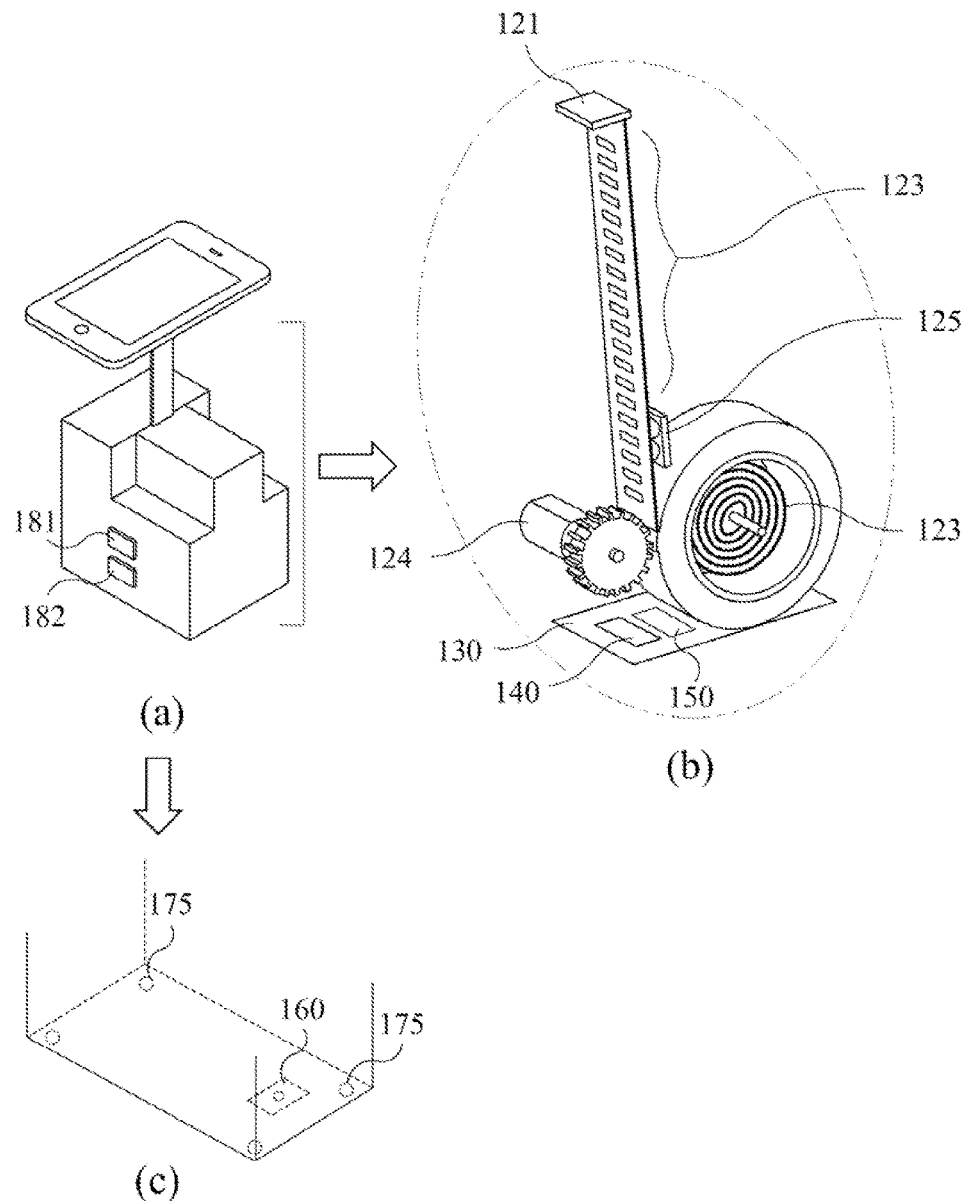
FIG. 2 is view illustrating the internal configuration of an interface device displaying 3D information and a bottom view of the interface device displaying 3D information.

FIG. 2 is view illustrating the internal configuration of the interface device 100 displaying 3D information and a bottom view of the interface device 100 displaying 3D information. FIG. 2(a) is a perspective view of the interface device 100 displaying 3D information which is illustrated in FIG. 1, FIG. 2(b) illustrates the internal configuration of the support unit 120 and a control circuit 130 with the housing 170 removed, and FIG. 2(c) is a view illustrating the bottom of the housing 170.

Input buttons 181 and 182 protruding outward from the housing 170 are illustrated in FIG. 2(a). An input unit such as the input buttons is illustrated in FIG. 2(a), but various input units capable of transmitting specific instructions to a computer system may be used. Such a device is referred to as an instruction input unit 180. Various types of devices such as a button type input device, a keypad, a joystick, and a touch panel are available for the instruction input unit 180. A user can change contents outputted by the content display unit 110 or input specific instructions, using the instruction input unit 180. Further, a user can input specific instructions to the content display unit 110 through the instruction input unit 180. The content display unit 110 and the interface device 100 can transmit/receive signals for instructions with each other through a wire or wirelessly.

For example, a user can input an instruction for at least one of changing a visual point of a 3D content or a basic content, enlarging an image content, reducing an image content, changing the color of a specific area in an image content, inputting a memo in a specific area in an image content, and changing the type of content, through the instruction input unit 180.

Alternatively, a user may control movement (on a plane) of the interface device 100 displaying 3D information, using the instruction input unit 180. There is a need for a driving unit that moves a device in order to move the interface device 100 displaying 3D information. Various types of devices that those skilled in the art can use are available for such a driving unit for moving. Further, a user may adjust the height of the content display unit 110, using the instruction input unit 180. For example, when a basic content is a structure, for example a building, a user can increase or decrease the height of the content display unit 110, in which the content display unit 110 can output a plan view or a view for the floor at a desired height.

Referring to FIG. 2(b), the support unit 120 has an upper support unit 121 where the content display unit 110 is seated, a lower support unit 123 that extends from the upper support unit 121 and changes in length to change the position of the upper support unit 121, a driving unit 124 that adjusts the length of the lower support unit 123, and an encoder 125 that measures the length of the lower support unit 123.

The upper support unit 121 is a seat for the content display unit 110. The content display unit 110 may be just seat on the upper support unit 121, or the upper support unit 121 or a portion of the upper support unit 121 and the content display unit 110 may be connected or fastened. When the content display unit 110 and the upper support unit 121 are connected, various types of mechanical fasteners may be used.

The content display unit 110 may be integrally fixed to the upper support unit 121, or the content display unit 110 and the upper support unit 121 may be separably coupled. For example, when the content display unit 110 is a smartphone, the smartphone may be seated on the upper support unit 121 having a stable flat surface without a fastener or it may be coupled to the upper support unit 121 by a specific coupling unit. When a case is formed on the rear side of the smartphone, a specific case that can be fixed to the upper support unit 121 may be used. Further, it may be possible to fix the smartphone by attaching a magnetic material to the upper support unit 121.

The lower support unit 123 extending from the upper support unit 121 has a relatively thin flat rod shape in FIG. 2(b). As the length of the lower support unit 123 is adjusted, the height of the upper support unit 121 or the content display unit 110 on the upper support unit 121 is adjusted. Various types of mechanical units may be used to adjust the length of the lower support unit 123.

In FIG. 2(b), for example, the lower support unit 123 is made of a flexible material, so it can be wound in a predetermined pattern. That is, the lower support unit 123 can be wound around a specific shaft like a tape measure and its length can be adjusted by a motor that is the driving unit 124. In the example illustrated in FIG. 2(b), the driving unit 124 is coupled to a specific gear and, as the teeth of the gear are fitted into slots of the lower support unit 123 and adjust the length of the lower support unit 123.

The encoder 125 is used to measure the current length of the lower support unit 123. The encoder 125 has only to be able to measure the current length of the lower support unit, so it may be disposed at various positions.

The support unit 120 illustrated in FIG. 2(b) is just an example and it should be understood that the support unit 120 may be replaced by various mechanical devices.

The interface device 100 displaying 3D information includes a control unit for controlling a device. The control circuit 130 is provided on the bottom of the support unit 120 in FIG. 2(b). The control circuit 130 may include a memory 140 and/or a communication module 150. Further, the memory 140 and/or the communication module 150 may be, independently from the control circuit 130, included in the interface device 100 displaying 3D information.

The memory 140 can keep control instructions for the control circuit 130 and may keep 3D content data to be outputted to the content display unit 110. The communication module 150 may perform various functions. For example, the communication module 150 may receive specific instructions or 3D contents from the main display device 50 and may transmit instructions, which are inputted through the instruction input unit 180 by a user, to the main display device 50. Further, the communication module 150 may transmit 3D contents in the memory 140 to the content display unit 110 or may transmit control instructions inputted through the instruction input unit 180 by a user to the content display unit 110.

The communication module 150 may perform wire or wireless communication. When the communication module 150 uses wireless communication, it may use local wireless communication that allows local devices to transmit/receive data such as Bluetooth, Wi-Fi direct, and NFC, may transmit/receive data using a mobile communication network such as 3G or 4G, and may transmit/receive data using the internet through communication such as Wi-Fi or a LAN. That is, it doesn't matter which types of communication protocol and communication the communication module 150 uses.

FIG. 2(c) illustrates the bottom of the housing 170. A position input unit 160 for inputting a position value of the main display device 50 protrudes on the bottom. For example, when the main display device 50 includes a touch panel, the position input unit 160 may be a unit for applying touch input to the main display device 50. The position input unit 160 may be a projection type part allowing for touch input in a static electric type or a voltage type. In the existing devices, a stylus pen may be available.

The main display device 50 may not be a touch input type device, but a typical output device. For example, the main display device 50 may be an output device such as the LCD monitor and a projector. In this case, the input unit 160 functions as a part capable of controlling the position of a specific pointer on the main display device 50. For example, like a mouse, it has only to be a device for a user to input the position of a pointer on the main display device 50. In detail, the position input unit 160 may include a mouse ball or an optical unit and a control unit. The control unit may be implemented by the control circuit 130 described above.

Further, the interface device 100 displaying 3D information of contents may be disposed on a specific assistant device corresponding to the image position of the main display device 50. For example, the interface device 100 displaying 3D information of contents may be disposed on a tablet that a user uses independently from the main display device 50, in which the position input unit 160 may be the pen used for tablets.

Projections 175 may be formed on the bottom of the housing 170, as illustrated in FIG. 2(c), in order to reduce friction when the interface device 100 displaying 3D information of contents moves on the display panel 51 of the main display device 50 or on a specific tablet. The projections 175 may be balls that can roll. An appropriate number of projections 175 can be used.

Figure 3:
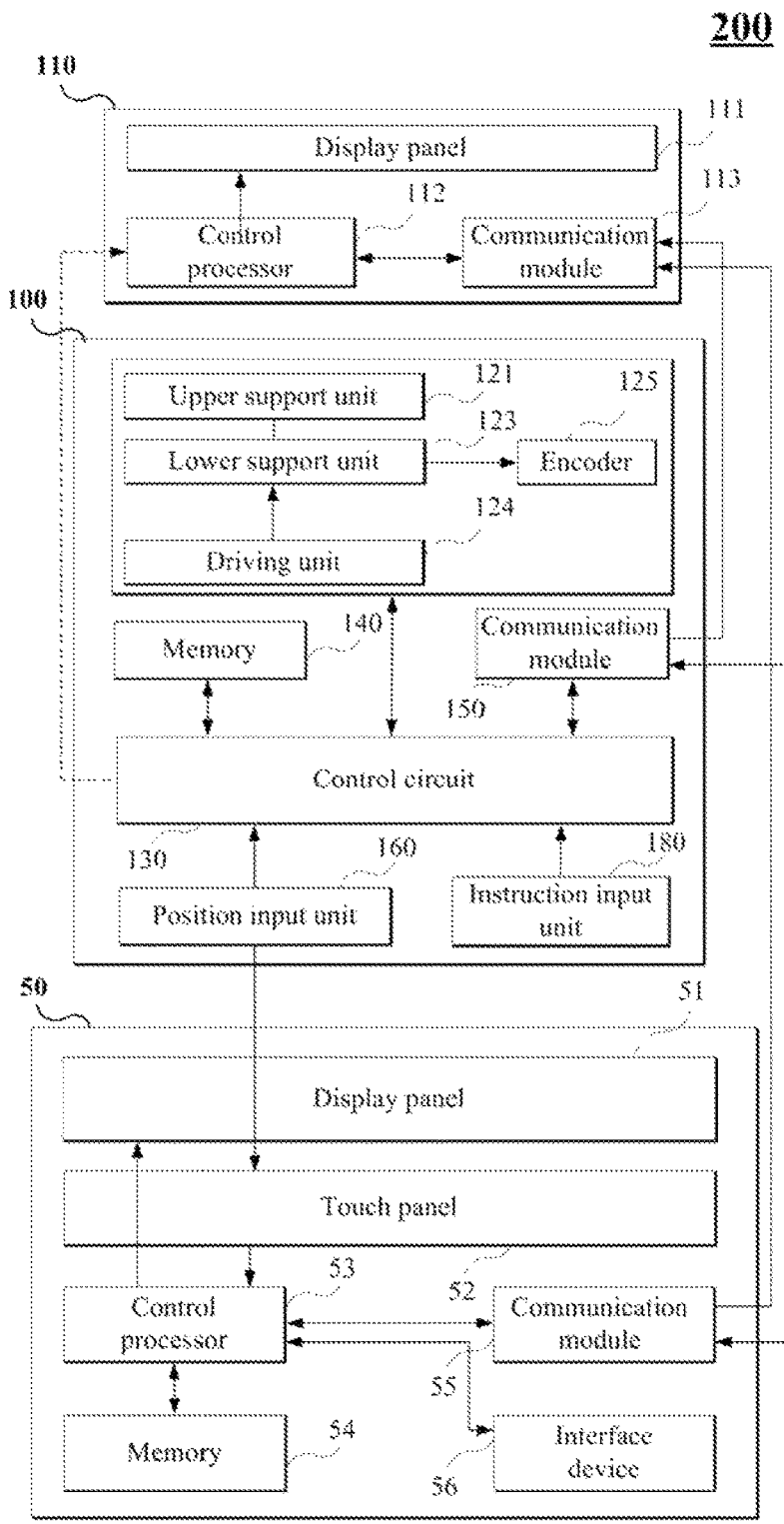
FIG. 3 is a block diagram illustrating an example of the configuration of a system for implementing 3D information of contents.

FIG. 3 is a block diagram illustrating an example of the configuration of a system 200 for implementing 3D information of contents. The main display device 50 and the interface device 100 displaying 3D information of contents are physically separate parts, and the content display unit 110 may be an independent part from other components, depending on whether it can be separated or not, in the interface device 100 displaying 3D information of contents. In FIG. 3, the content display unit 110 is illustrated as an independent block from the interface device 100, on the assumption that it can be separated, such as a smartphone.

The content display unit 110 may include a display panel 111, a control processor 112 controlling contents outputted on the display panel 111, and a communication module 113 for transmitting/receiving data to/from another device. When the content display unit 110 is a part of the interface device 100 displaying 3D information of contents, the display panel 111 can be controlled by the control circuit 130, in which data may be directly received through a wire without the communication module 113 (control flow indicated by a dotted line in FIG. 3).

Since the main display device 50 is basically an independent display device, it may include a display panel 51 on which basic contents are outputted, a control processor 53 for controlling contents outputted on the display panel 51, a memory 54 keeping basic contents or temporary data, and a communication module 55 for transmitting/receiving data to/from another device. When the main display device 50 uses a touch input type, it may include a touch panel 52.

The interface device 100 displaying 3D information of contents on a main display device may be implemented in several types, depending on which configuration a source device providing 3D information has in the relationship with the main display device 50. Some examples are described hereafter.

1) Case when the interface device 100 displaying 3D information of contents keeps all 3D contents in advance (hereafter, referred to as a first mode). In this case, the interface device 100 can output a 3D content in the memory 140 on the basis of a planar reference position or a 3D reference position transmitted from the main display device 50. The planar reference position can be transmitted by the main display device 50 determining a position inputted through the position input unit 160. The interface device 100 may determine and use the planar reference position in person (when the position input unit 160 transmits information to the control circuit 130 in FIG. 3).

(2) Case when the interface device 100 displaying 3D information of contents receives a 3D content from the main display device 50 and outputs it to the content display unit 110 (hereafter, referred to as a second mode). The interface device 100 can receive a 3D content for a planar reference position from the communication module 55 of the main display device 50 through the communication module 150.

In this case, it may receive the 3D content from another storage device, not the main display device 50. The interface device 100 may receive the 3D content from a remote 3D content server through the internet or a mobile communication network, using the communication module 150.

(3) Case when the content display unit 110 receives a 3D content from the main display device 50 or the storage device described above (hereafter, referred to as a third mode). In this case the content display unit 110 receives a 3D content through a specific communication module 113. This type is available when the content display device 110 is a terminal including specific communication module and control unit such as a smartphone.

First Mode

The above-mentioned configuration of the interface device 100 displaying 3D information of contents is not or simply described hereafter.

The interface device 100 displaying 3D information of contents includes: a position input unit 160 that allows a user to input a planar reference position exhibiting 2D coordinates on a main display device displaying 2D planar information; a memory 140 that keeps 3D contents corresponding to height information for planar reference positions; a content display unit 110 that outputs 3D contents; a support unit 120 that adjusts an upper support unit 121, where the content display unit 110 is seated, or the height of the upper support unit 121 to fit to height information, or adjusts the height of the upper support unit in accordance with an external force; and a control circuit 130 that controls the memory 140, the content display unit 110, and the support unit 120.

The support unit 120 automatically controls the height of the content display unit 110 or the upper support unit 121 basically in accordance with height information of a planar reference position. However, the height of the display unit 110 or the upper support unit 121 may be adjusted by an external force applied to the upper support unit 121 by a user. In the latter case is a case when a user wants to check 3D content corresponding to specific height information or change data for a specific planar reference position. Detailed description will be provided below. As described above, a user may control the height of the upper support unit 121 using the instruction input unit 180. The fact that the height of the display unit 110 or the upper support unit 121 is adjusted by an external force herein includes a case when the height of the display unit 110 or the upper support unit 121 is adjusted by the instruction input unit 180.

The position input unit 160, as described above, may allow a user to input a planar reference position using a contact unit for contacting the touch panel 52 of the main display device 50 or using an input unit corresponding to the position of a pointer on the screen of the main display device 50.

3D contents may be image contents on 3D reference positions determined on the basis of planar reference positions and height information, in the basic contents kept in the main display device 50 or a specific storage device.

The support unit 120 includes an upper support unit 121 where a content display unit is seated, a lower support unit 123 extending from the upper support unit 121 and changing in length to change the height of the upper support unit, a driving unit 124 adjusting the length of the lower support unit 123, and an encoder 125 measuring the length of the lower support unit 123.

Second Mode

The interface device 100 displaying 3D information of contents includes: a position input unit 160 that allows a user to input a planar reference position corresponding to 2D coordinates on the main display device 50 displaying 2D planar information; a communication module 150 that receives 3D contents corresponding to height information for planar reference positions from the main display device 50 or a specific storage device through wire or wireless communication; a content display unit 110 that outputs 3D contents; a support unit 120 that includes an upper support unit 121 where the content display unit 110 is seated, a lower support unit 123 extending from the upper support unit 121, and a driving unit 124 adjusting the length of the lower support unit 123; and a control circuit 130 that controls the communication module 150, the content display unit 110, and the support unit 120.

In this case, the interface device 100 displaying 3D information of contents receives 3D contents from the communication module 55 of the main display device 50 or a specific storage device, through the communication module 150. The interface device 100 displaying 3D information of contents outputs the received 3D contents to the content display unit 110.

Third Mode

The interface device 100 displaying 3D information of contents includes: a position input unit 160 that allows a user to input a planar reference position corresponding to 2D coordinates on the main display device 50 displaying 2D planar information; a content display unit 110 that receives 3D contents corresponding to height information for planar reference positions from the main display device 50 or a specific storage device through wire or wireless communication and outputs 3D contents; a support unit 120 that includes an upper support unit 121 where the content display unit 110 is seated, a lower support unit 123 extending from the upper support unit 121, and a driving unit 124 adjusting the length of the lower support unit 123; a communication module 150 that transmits/receives control signals to/from at least one of the content display unit 110 or the support unit 120; and a control circuit 130 that controls the content display unit 110 and the support unit 120 through the communication module 150.

The content display unit 110 may be at least any one of a smartphone, a tablet PC, and a mobile terminal and may be separably coupled to the upper support unit 121.

A technical configuration available to all of the three modes is described hereafter.

The interface device 100 displaying 3D information of contents is a tangible interface device. The tangible interface device constitutes a system 200 implementing 3D information of contents in cooperation with the main display device 50 that outputs original planar information.

The tangible interface device may include an input unit 180 for inputting at least one of instructions for changing the visual point of a image content, enlarging an image content, reducing an image content, changing the color of a specific area in an image content, inputting a memo in a specific area in an image content, and changing the type of content.

The main display device 50 may further include an interface device 56 for inputting a content outputted by the content display unit 110 or a memo for a specific area of a content to the main display device 50 or a storage device. A memo inputted through the interface device 56 may be kept in a memory 54 keeping basic contents or a specific storage device. Accordingly, it is possible to check the memo when a user or another user accesses the 3D content. Further, it may be possible to add a memo to the 3D content through the input unit of the tangible interface device. In this case, it is possible to transmit a memo to the main display device 50 or a specific storage device through the communication module 150 of the interface device 100 displaying 3D information of contents.

Figure 4A:
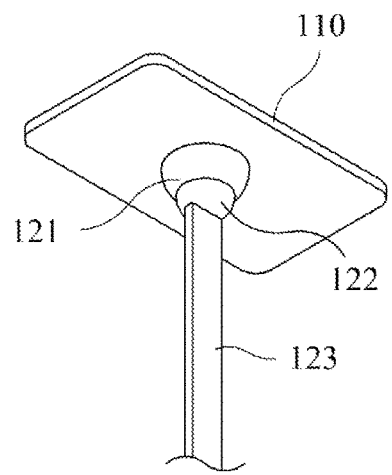
FIG. 4A is a view illustrating an example in which an upper support un supporting a content display unit of the interface device displaying 3D information and FIG. 4B is a view illustrating an example of turning the content display unit in predetermined direction.
Figure 4B:
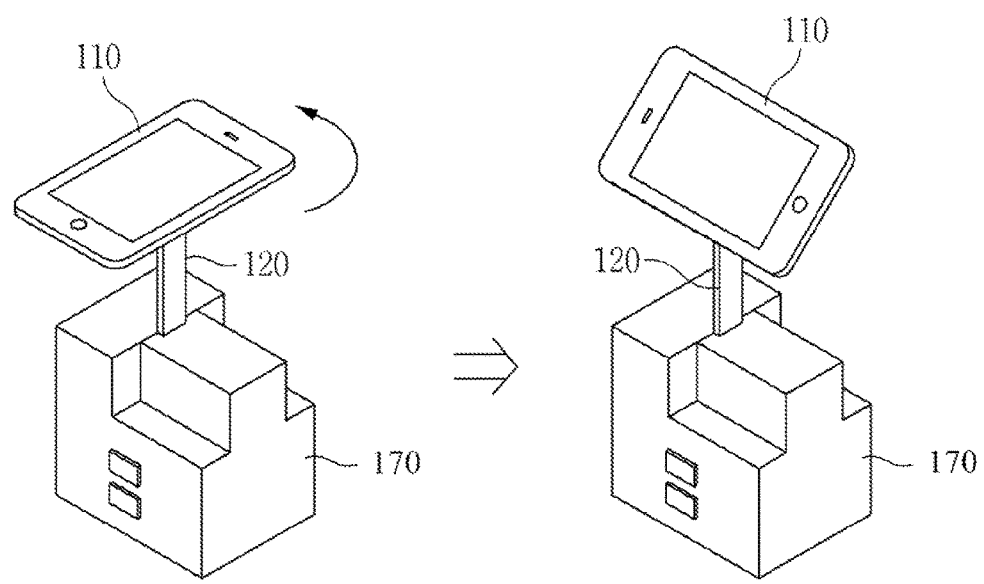

FIG. 4A is a view illustrating an example in which the upper support unit 121 supporting the content display unit 110 of the interface device 100 displaying 3D information and FIG. 4B is a view illustrating an example of turning the content display unit 110 in predetermined direction.

The content display unit 110 may be connected to the upper support unit 121 by a turnable joint or the upper support unit 121 may be connected to the lower support unit 123 by a turnable joint 122. FIG. 4A illustrates an example when the upper support unit 121 and the lower support 122 are connected by a joint 122. The part such as a joint is not necessarily used and various parts may be used as long as the content display unit 110 can turn in predetermined patterns with respect to the display plane of the main display device 50 or a plane perpendicular to the gravity.

FIG. 4B illustrates an example when the content display unit 110 or the upper support unit 121 is turned by a turnable part. Although the content display unit 110 or the upper support unit 121 is turned, it is expressed like that the content display unit 110 is turned for the convenience of description.

In this case, 3D contents may be image contents corresponding to the turning direction of the content display unit 110. A plan view is enough for a cross-section of structures such as a building, but different kinds of 3D contents may be outputted in accordance with turning of the content display unit 110, for contents to which images at various angles are important. For example, ultrasonic images, CT images, and MRI are used in the medical image field, a cross-sectional image at a predetermined angle for a specific position (3D reference position) may be provided for diagnosis of diseases. Further, for images having different contents in accordance with the direction of a visual point, such as images of constellations, it is meaningful that the content display unit 110 turns.

A user may turn the content display unit 110 may be turned at predetermined angles in person or may turn the content display unit 110 using the instruction input unit 180 such as direction buttons or a joystick.

A 3D content is at least one of an image content parallel with 2D planar information at a 3D reference position, an image content for a predetermined cross-sectional not parallel with 2D planar information at a 3D reference position, and an image content with a visual point at a 3D reference position.

Figure 5:
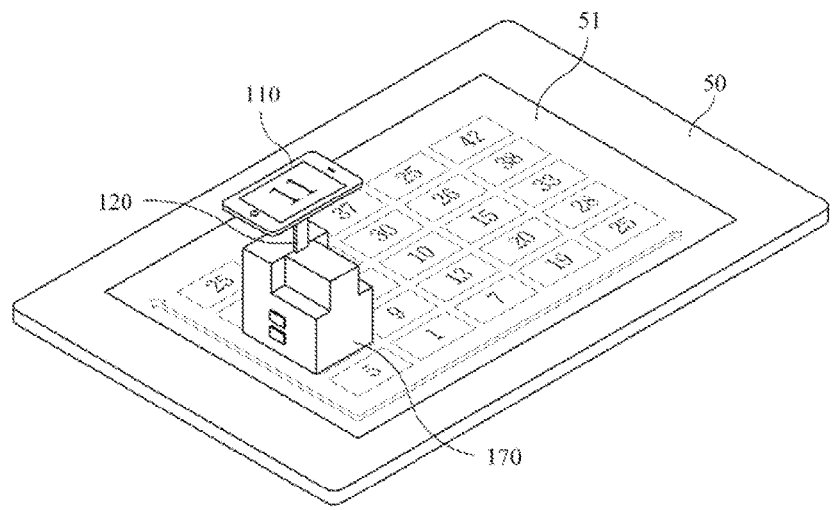
FIG. 5 is view illustrating an example in which the interface device displaying 3D information displays specific 3D information while moving on the main display device.
Figure 5:
Figure 5:
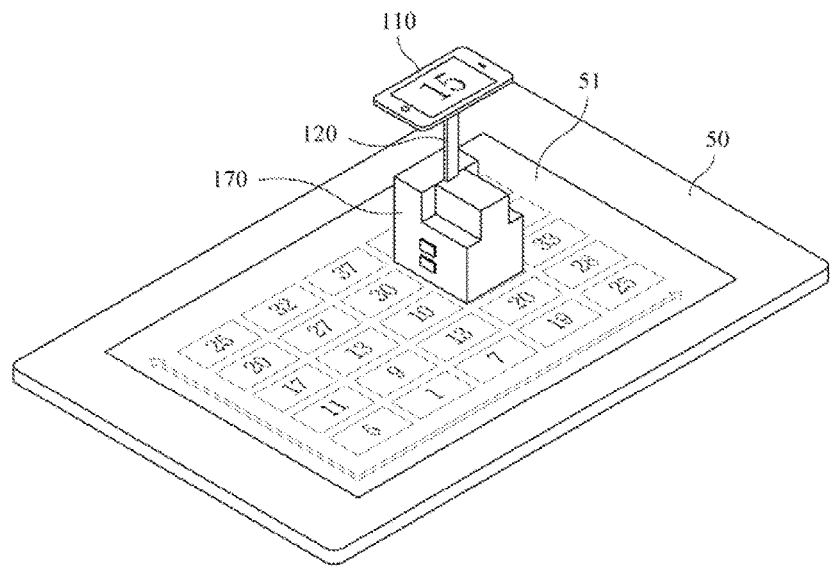

FIG. 5 is view illustrating an example in which the interface device 100 displaying 3D information displays specific 3D information while moving on the main display device 50.

Various kinds of basic contents are outputted from the main display device 50. FIG. 5 illustrates a table arranged with respect to 2D axes. The main display device 50 outputs the sections in the table as cross-sections seen from above without solidity. A rectangular block displayed by the main display device 50 is one section and the number in the block means the height of the section.

The interface device 100 displaying 3D information is positioned at on the second section upward from the left lower corner in FIG. 5(a). The interface device 100 displaying 3D information is positioned such that the position input unit 160 inputs a position value for the planar reference position. Since the section has a height of 11, the content display unit 110 is adjusted to have a height value of 11 with respect to a predetermined reference. The content display unit 110 outputs a section value of 11.

When the interface device 100 displaying 3D information is moved to another position, the height of the content display unit 110 is adjusted to the height of the corresponding section and the output value is also changed. The interface device 100 displaying 3D information has moved to a section with a value of 15 in FIG. 5(b). Since the value is larger than 11, the content display unit 110 has been adjusted to have a higher value than that in FIG. 5(a). Further, 15—that is the value of the section is displayed on the content display unit 110.

Although a sectional table is exemplified in FIGS. 5(a) and 5(b) for the convenience of description, the height of the content display unit 110 may be adjusted in accordance with the height (altitude) of a specific planar position in a basic content like a map and an enlarge plan view for the planar reference position may be outputted on the content display unit 110. A user can enlarge or reduce 3D contents through the instruction input unit 180.

Further, the height of the content display unit 110 may be adjusted in accordance with the heights of buildings at planar reference positions in basic contents for a city with the buildings. In this case, the plane of the uppermost floor of a building may be outputted on the content display unit 110, and when a user adjusts the height of the content display unit 110, a plan view of the building for the corresponding height may be outputted on the content display unit 110.

Further, for a basic content showing a complex with completed apartments in a model house, it may be possible to position the interface device 100 displaying 3D information on a specific apartment and provide the view of a specific floor to a user through the content display unit 110.

The technology described herein can provide various 3D contents through the interface device 100 displaying 3D information for various basic contents. The device and contents may be provided for various purposes such as education, marketing, giving amusement, and a game.

Figure 6:
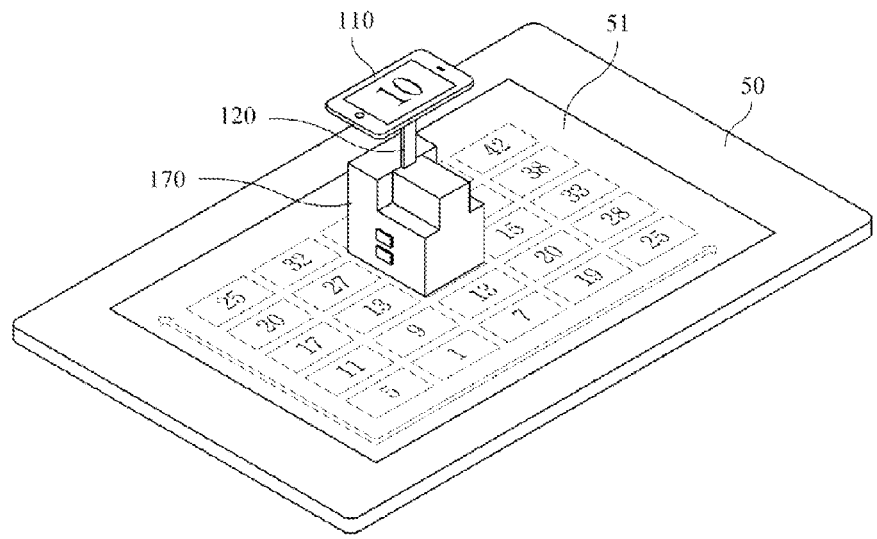
FIG. 6 is view illustrating an example of inputting predetermined data using the interface device displaying 3D information.
Figure 6:
Figure 6:
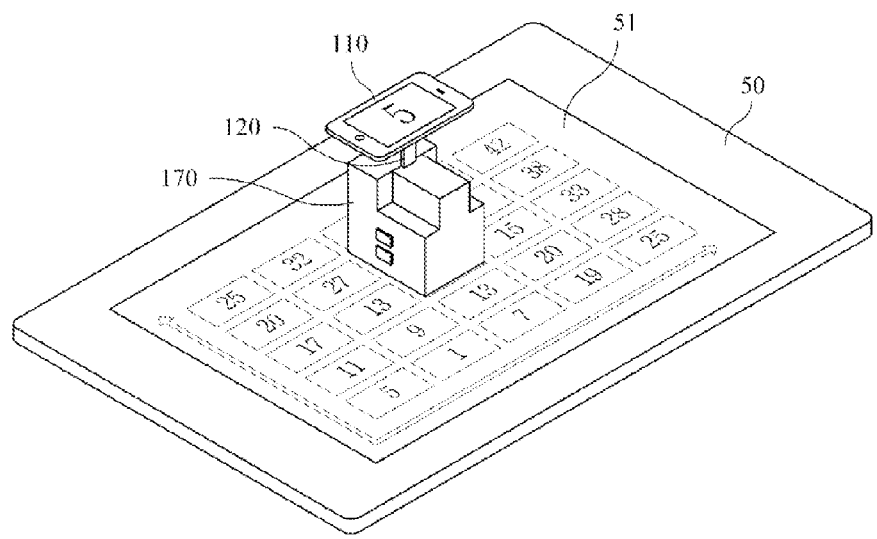

FIG. 6 is perspective view illustrating an example of inputting predetermined data using the interface device 100 displaying 3D information. A table type of basic content, as in FIG. 5, is exemplified in FIG. 6.

The interface device 100 displaying 3D information is now on a section with a value of 10 FIG. 6(*a*). The content display unit 110 has a height of 10. A user can adjust the height of the content display unit 110 by applying an external force. Adjustment of the height of the content display unit 110 by an external force includes height adjustment through the instruction input unit 180.

When a user moves the content display unit 110 down from the section with a height of 10, the height of the section decreases. The height of the content display unit 110 has been decreased finally to 5 in FIG. 6(*b*). The content display unit 110 can output the decreased height of the section.

The control circuit 130 transmits the changed height value, as data for 2.5 content to be changed, to the main display device 50 or a specific storage device through the communication module 150.

FIG. 6 consequently illustrate an example of changing or inputting data of a basic content with the interface device 100 displaying 3D information. Then, the section with a value of 5 changed from 10 by the user may keep having the value of 5.

As illustrated in FIG. 6, it is possible to change numerals for a specific study result or marketing data on the spot in a meeting, using the interface device 100 displaying 3D information.

Further, a user may input specific data through the interface device 56 of the main display device 50 or the instruction input unit 180 after adjusting the height of the content display unit 110.

As set forth above, according to exemplary embodiments of the invention, an intuitive interface is provided for a user by using 3D image information included in 2D images.

Further, the example may be available for various fields such as education, work in companies, and marketing. In particular, the example may be available for an interface device for a cooperative environment such as tabletops or surface computing.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An interface device displaying information of first contents displayed by a main display device, the interface device comprising:
   a memory configured to store additional contents for the first contents;
   a content display unit configured to display second contents;
   at least one support configured to seat the content display unit, and change in length to adjust a vertical position of the content display unit; and
   a processor configured to
      determine the second contents among the additional contents based on a position of the interface device on the main display device,
      determine a height value of the second contents, and
      transmit a command to the at least one support to adjust the vertical position of the content display unit according to the height value,
   wherein the second contents have the height value of a part of contents of the first contents, wherein the part of contents is displayed by the main display device and is located at the position of the interface device, and
   wherein the main display device determines the position of the interface device by an input from the interface device.

2. The interface device of claim 1, wherein the second contents are image contents which are determined on the basis of 2D coordinate values of the position of the interface device and height information for the first contents on the position of the interface device.

3. The interface device of claim 2, wherein the second contents are image contents with a view point at a 3D coordinate which defined 2D coordinate values of the position and the height value.

4. The interface device of claim 1, wherein the at least one support includes:
   an upper support configured to seat the content display unit;
   a lower support extending from the upper support and configured to change in length to change the height of the upper support;
   a motor coupled to the lower support to adjust the length of the lower support; and
   circuitry configured to measure the length of the lower support via an encoder.

5. The interface device of claim 4, wherein the lower support is made of a flexible material, and
   when the lower support is moved down by the motor, a portion of the lower support is wound.

6. The interface device of claim 4, wherein the content display unit turns with the upper support.

7. The interface device of claim 1, wherein the interface device inputs the position of the interface device by contacting a touch panel of the main display device.

8. The interface device of claim 1, wherein the second contents are image contents with a view point according to turning directions of the content display unit.

9. The interface device of claim 1, wherein the content display unit is at least one of a smartphone, a tablet PC, and a mobile terminal and the content display unit is separably attached to the at least one support.

10. An interface device displaying information of first contents displayed by a main display device, the interface device comprising:
    a content display unit configured to display second contents;
    at least one support configured to seat the content display unit, and change in length to adjust vertical position of the content display unit; and
    a processor configured to
        determine the second contents based on a position of the interface device on the main display device,
        determine a height value of the second contents, and
        transmit a command to the at least one support to adjust the vertical position of the content display unit according to the height value,
    wherein the second contents have the height value of a part of contents of the first contents,
    wherein the part of contents is displayed by the main display device and is located at the position of the interface device, and the second contents is received from the main display device or a specific storage device through wire or wireless communication, and
    wherein the main display device determines the position of the interface device by an input from the interface device.

11. The interface device of claim 10, wherein the second contents are image contents with a view point at a 3D coordinate which defined 2D coordinate values of the position of the interface device and the height value.

12. The interface device of claim 10, wherein the second contents are image contents with a view point according to turning directions of the content display unit.

* * * * *